(12) United States Patent
Roune et al.

(10) Patent No.: US 11,715,010 B2
(45) Date of Patent: Aug. 1, 2023

(54) CROSS REPLICA REDUCTION ON NETWORKS HAVING DEGRADED NODES

(71) Applicant: Google LLC, Mountain View, CA (US)

(72) Inventors: Bjarke Hammersholt Roune, Mountain View, CA (US); Sameer Kumar, Mountain View, CA (US); Norman Paul Jouppi, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 997 days.

(21) Appl. No.: 16/543,410

(22) Filed: Aug. 16, 2019

(65) Prior Publication Data

US 2021/0049408 A1    Feb. 18, 2021

(51) Int. Cl.
*G06N 3/084* (2023.01)
*G06N 20/00* (2019.01)
(Continued)

(52) U.S. Cl.
CPC ......... *G06N 3/084* (2013.01); *G06F 18/2115* (2023.01); *G06F 18/2148* (2023.01); *G06F 18/23* (2023.01); *G06N 20/00* (2019.01)

(58) Field of Classification Search
CPC .. G06K 9/6231; G06K 9/6218; G06K 9/6257; G06N 20/00; G06N 3/084; H04L 67/10
See application file for complete search history.

(56) References Cited

U.S. PATENT DOCUMENTS 6,278,997 B1    8/2001  Agrawal
6,442,694 B1    8/2002  Bergman et al.
(Continued)

FOREIGN PATENT DOCUMENTS

CN    104281853    1/2015
CN    105051693    11/2015
CN    105550374    5/2016

OTHER PUBLICATIONS

Jia et al., "Highly scalable deep learning training system with mixed-precision: training imagenet in four minutes" arXiv, Jul. 2018, 9 pages.

(Continued)

*Primary Examiner* — Nicholas R Taylor
*Assistant Examiner* — Sanjoy K Roy
(74) *Attorney, Agent, or Firm* — Fish & Richardson P.C.

(57) ABSTRACT

Methods, systems, and apparatus, including instructions encoded on storage media, for performing reduction of gradient vectors for a network having one or more degraded nodes. A method comprises training a respective replica of a machine learning model on each node of multiple nodes organized in an n-dimensional network topology, combining the respective individual gradient vectors in the nodes to generate a final gradient vector by performing operations comprising: designating each group of nodes along the dimension as either a forwarding group or a critical group, updating, for each receiving node, a respective individual gradient vector with an intermediate gradient vector, performing a reduction on each critical group of nodes along the dimension to generate a respective partial final gradient vector for the critical group, and updating, for each critical group of nodes, an individual gradient vector for a representative node with the respective partial final gradient vector.

30 Claims, 12 Drawing Sheets

(51) Int. Cl.
  *G06F 18/2115* (2023.01)
  *G06F 18/23* (2023.01)
  *G06F 18/214* (2023.01)

(56) References Cited

U.S. PATENT DOCUMENTS

| | | | |
|---|---|---|---|
| 10,055,692 B1 | 8/2018 | McLaren et al. | |
| 2004/0073590 A1 | 4/2004 | Bhanot et al. | |
| 2006/0179268 A1* | 8/2006 | Archer | G06F 15/16 712/11 |
| 2008/0148013 A1 | 6/2008 | Jia | |
| 2013/0290223 A1* | 10/2013 | Chapelle | G06N 20/00 706/12 |
| 2013/0339499 A1 | 12/2013 | George et al. | |
| 2016/0103901 A1* | 4/2016 | Kadav | G06F 9/46 707/614 |
| 2017/0091668 A1* | 3/2017 | Kadav | G06F 9/46 |
| 2018/0144242 A1* | 5/2018 | Simard | G06N 3/084 |
| 2018/0240039 A1* | 8/2018 | Mclaren | G06N 20/00 |
| 2019/0197404 A1* | 6/2019 | Wang | G06N 3/04 |
| 2019/0220758 A1* | 7/2019 | Talyansky | G06N 20/00 |

OTHER PUBLICATIONS

Li et al., "MALT: distributed data-parallelism for existing ML applications" 2014 Ottawa Linux Symposium, Jan. 2015, 16 pages.
Mikami et al., "Massively Distributed SGD: ImageNet/ResNet-50 Training in a Flash" arXiv, Nov. 2018, 7 pages.
PCT International Search Report in International Application No. PCT/US2020/044336, dated Nov. 6, 2020, 19 pages.
CN Office Action in Chinese Application No. 201810153965.2, dated Aug. 27, 2019, 8 pages.
CN Office Action in Chinese Application No. 201810153965.2, dated Mar. 29, 2019, 10 pages.
EP Office Action in European Application No. 18157584.6-1221, dated Aug. 27, 2018, 2 pages.
Extended European Search Report issued in European Application No. 18157584.6, dated Jun. 8, 2018, 15 pages.
GB Office Action in Great Britain Application No. GB 1802758.1, dated Aug. 22, 2018, 6 pages.
International Search Report and Written Opinion issued in International Application No. PCT/US2018/017406, dated Jun. 8, 2018, 21 pages.
PCT International Preliminary Report on Patentability in International Application No. PCT/US2018/017406, dated Sep. 6, 2019, 15 pages.
Toldan and Kumar, "Design and Implementation of (N X N) Folded Torus Architecture for Network on Chip with E-Cube Routing," International Journal of Computer Science and Communication, Sep. 2013, 4(2): 145-152.
TW Office Action in Taiwan Application No. 107105429, dated Dec. 20, 2018, 10 pages (with English translation).
TW Office Action in Taiwan Application No. 107105429, dated Mar. 27, 2019, 6 pages (with English translation).
Wang et al., An Efficient Algorithm of Frequent Itemsets Mining Based on MapReduce, May 20, 2014, Journal of Information & Computational Science; 11:8; pp. 2809-2816.
PCT International Preliminary Report on Patentability in International Application No. PCT/US2020/044336, dated Mar. 3, 2022, 12 pages.

* cited by examiner

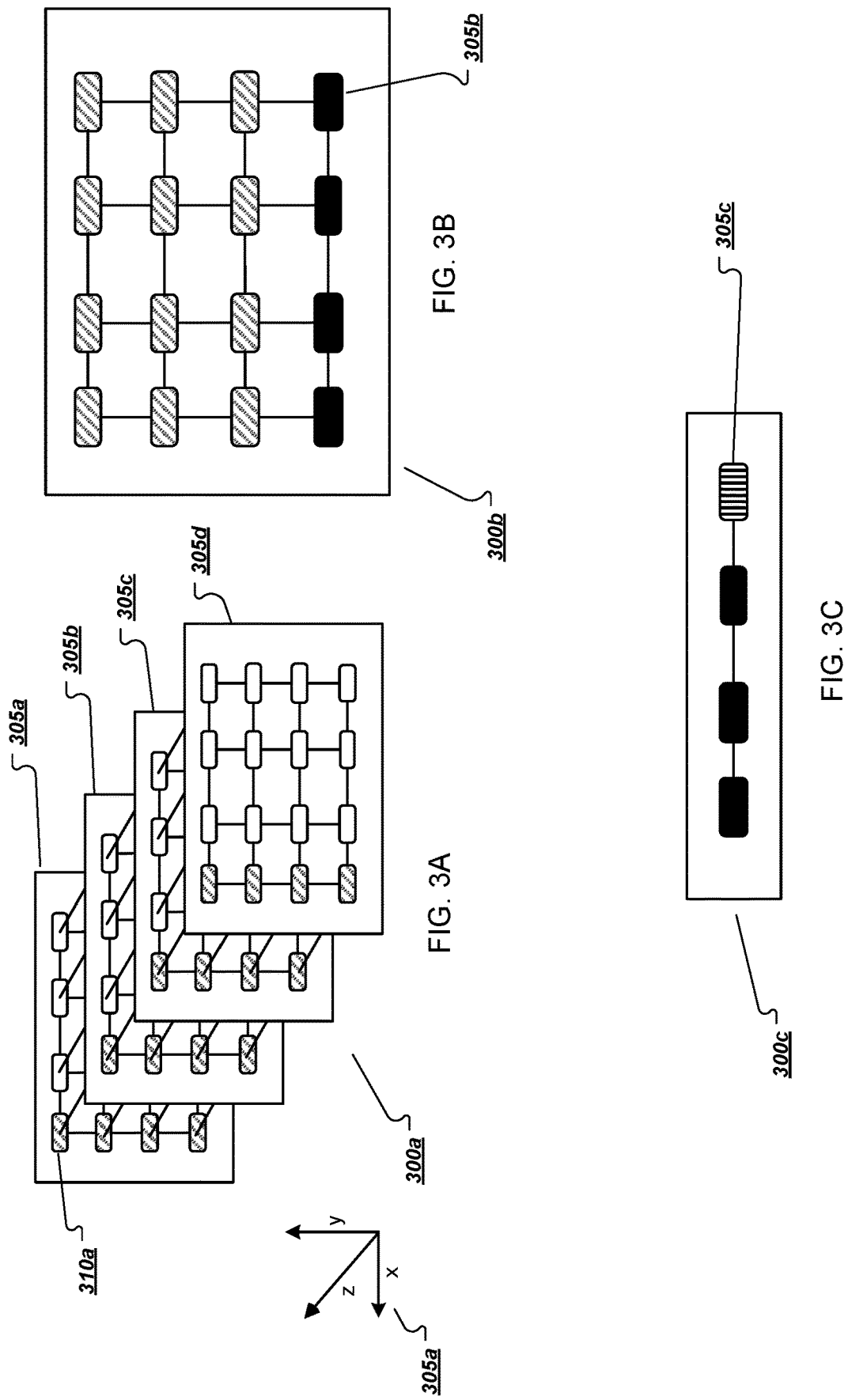

CROSS REPLICA REDUCTION ON NETWORKS HAVING DEGRADED NODES

BACKGROUND

This specification relates to parallel processing large datasets of non-scalar data.

Machine learning models receive input and generate output based on the received input and on values of model parameters. These models often need to be trained using received inputs from very large datasets.

A machine learning model can be trained on a distributed network that is configured to train multiple replicas of the machine learning model on different batches of training data. A distributed network can define various topologies, such as a mesh or a torus topology, and can be of arbitrary dimension. The distributed network can train each replica individually and in parallel and update model parameter values for the machine learning model based on the results of the training.

SUMMARY

This specification describes technologies relating to parallel processing of large datasets in general, and specifically to parallel processing large datasets on machine learning model replica networks having one or more degraded nodes. A machine learning replica network ("replica network") can have a plurality of nodes, with each node having respective processing units configured to train a respective replica of a machine learning model on a batch of training data. A training system for the replica network can train the machine learning model despite one or more degraded nodes of the network, which may be degraded, for example, because of hardware failure or communication failure.

Particular implementations of the subject matter described in this specification can be implemented so as to realize one or more of the following advantages. A training system can train a machine learning model even when one or more nodes in a network of nodes training replicas of the machine learning model are degraded. The training system can route and distribute computation such that the computing resources of non-degraded nodes are used efficiently during the training. The training system implementing the techniques described in this specification can avoid further degradation or impaired performance caused by overheating at regions of the replica network when data traffic is naively rerouted around degraded nodes as may be performed under conventional approaches. The training system can train a replica network without physical modifications to the replica network. The training system can train a replica network of either a mesh or torus topology and an arbitrary dimension.

The details of one or more implementations of the invention are set forth in the accompanying drawings which are given by way of illustration only, and the description below. Other features, aspects, and advantages of the invention will become apparent from the description, the drawings, and the claims.

BRIEF DESCRIPTION OF THE DRAWINGS

FIG. 3A illustrates a replica network having a three-dimensional mesh topology.

FIG. 3B illustrates a sub-network of the replica network having a two-dimensional mesh topology of representative nodes storing a partial final gradient vector after a first reduction.

FIG. 3C illustrates a sub-network of the replica network having a one-dimensional mesh topology of representative nodes storing an updated partial final gradient vector after a second reduction.

Like reference numbers and designations in the various drawings indicate like elements.

DETAILED DESCRIPTION

Figure 1:
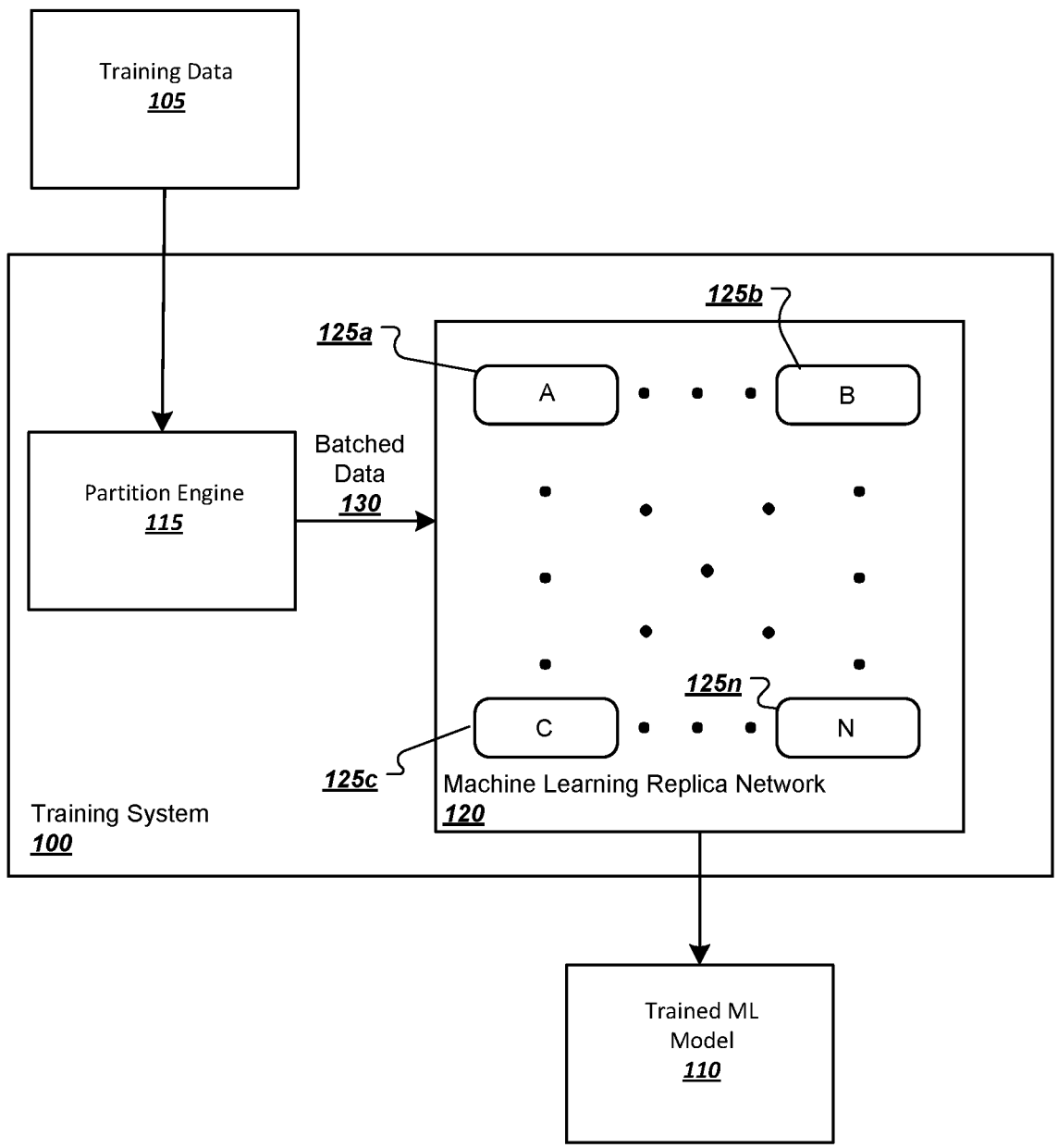
FIG. 1 illustrates an example training system.

FIG. 1 illustrates an example training system 100. The training system 100 can receive training data 105 and output data specifying a machine learning model 110. The training system 100 can include a partition engine 115 and a machine learning replica network 120.

The training system 100 can receive the training data in any appropriate manner. For example, the training system 100 can receive training data as an upload from a remote user of the system over a data communication network, e.g., using an application programming interface ("API") made available by the system 100. In some implementations, the training system can maintain a repository of training data and the system 100 can receive an input from a user specifying which data in the repository to use as the training data 105.

The data specifying the trained machine learning model 110 can specify an architecture of the machine learning model and learned parameter values for the model 110. For example, the trained machine learning model 110 can be a neural network having a plurality of network layers, including an input layer and an output layer. Each network layer can include one or mode nodes that are configured to receive an input and perform an operation to generate an output activation, according to one or more learned parameter values, called weights. The output activation can be the input for a node in a subsequent network layer, or can be part of an output for the neural network, e.g., because the node is at the output layer of the neural network.

The data specifying the trained machine learning model 110 can include the learned parameter values for the machine learning model. In some implementations where the machine learning model is a neural network, the data defining the trained model can specify trained weights for each network layer. The model parameter values are generally organized as non-scalar data, e.g., as a vector, a two-dimensional matrix or tensor, a three-dimensional matrix or tensor, or a matrix or tensor of higher degree.

The data specifying the trained machine learning model 110 can be used in processing new input data. Alternatively, or in addition to generating the data defining the trained machine learning model 110, the training system 100 can instantiate an instance of the trained machine learning model having the same architecture and learned parameter values as the machine learning model 110. The instance of the trained machine learning model can be executed to generate new outputs to perform a machine learning task.

The partition engine 115 can be configured to receive the training data 105 and generate batched data 130. Each batch of training data in the batched data 130 can be unique from every other batch generated by the partition engine 115. The partition engine can send, to each node 125a-n, a respective batch of training data to process through a respective machine learning model replica.

The machine learning replica network 120 ("replica network") can include a plurality of nodes 125a-n. Each node 125a-n can include a processing unit configured to receive a batch of training data and process the batch through a respective replica of a machine learning model. The processing units can implemented on one or more integrated circuits ("chips") of one or more computing devices.

Each node 125a-n can be configured to train a respective replica by any appropriate machine learning training technique, e.g., by any appropriate supervised learning technique. In this specification, the term training is used to describe the process in which the training system 100 updates parameter values for the model replicas in the replica network 120. For example, if the machine learning model is a neural network, each node 125a-n can process an input batch of training examples through a forward pass of each network layer of a respective model replica, and then update the weights at each network layer, e.g., by backpropagation using batch gradient descent to calculate gradients of a loss function.

The machine learning replica network 120 can also include one or more high-speed communication links between the plurality of nodes 125a-n. In some implementations where the nodes are implemented on a plurality of chips, links across chip boundaries are inter-chip network links. In some implementations where the processing units of the nodes 125a-n are on the same chip, each node can communicate with other nodes over intra-chip interface links.

One or more of the links can be half-duplex links on which only one processing unit can transmit data at a time. One or more of the links can be full-duplex links on which data can be transmitted in both directions, simultaneously. In some implementations, the machine learning replica network 120 includes one or more half-duplex links and one or more full-duplex links connecting together a plurality of nodes having processing units on the same chip, and one or more other nodes having processing units implemented across a plurality of chips.

The machine learning replica network 120 can define a network topology. A network topology refers to the configuration of nodes and links in a network. A network can also have one or more dimensions. Each link between nodes belongs to a respective dimension of the network topology. Each dimension can have one or more groups of nodes along a dimension.

Figure 2A:
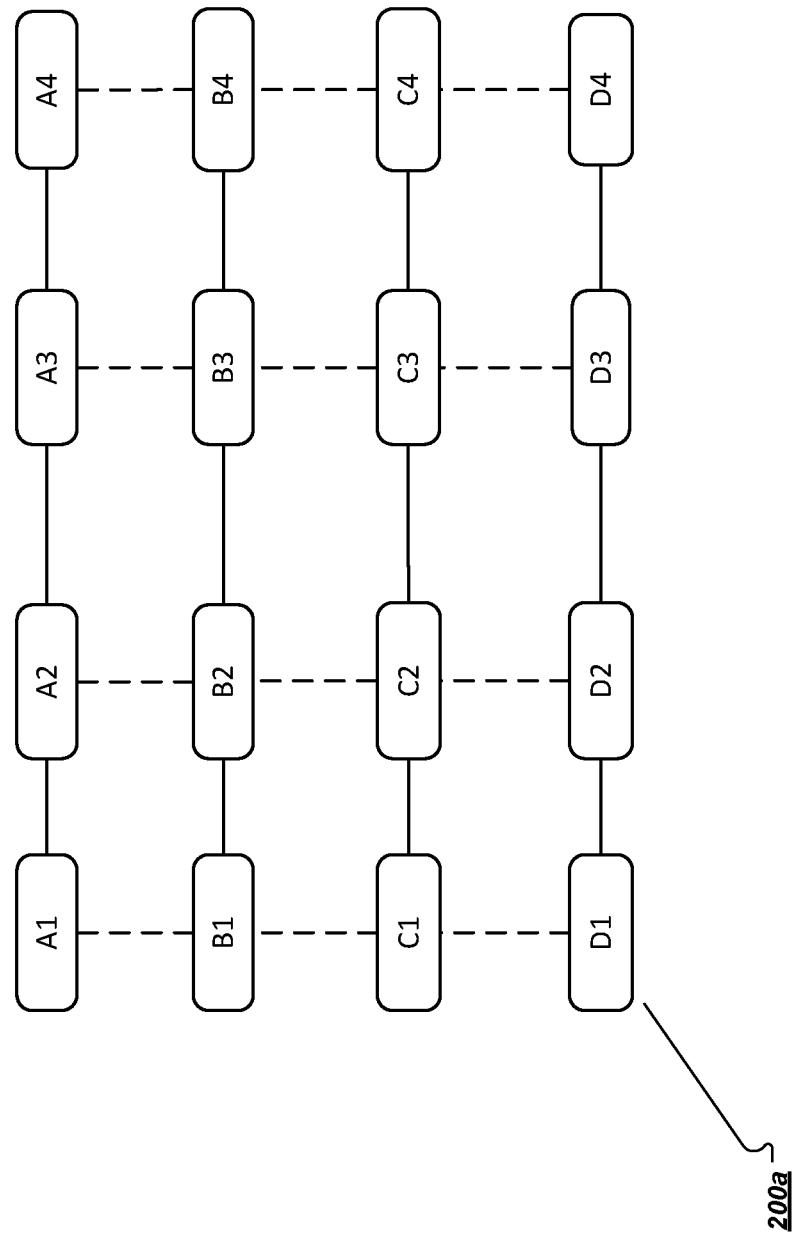
FIG. 2A illustrates a network with a two-dimensional mesh topology.

FIG. 2A illustrates a network with a two-dimensional mesh topology 200a. A two-dimensional mesh consists of $k_1 * k_0$ nodes, where $k_i$ represents the number of nodes along one dimension of the mesh. For example, the dimensions of the network 200a are 4*4, for a total of 16 nodes. In general, an n-dimensional mesh will have $k_{n-1} * k_{n-2} * \ldots * k_0$ nodes, where $k_i$ represents the number of nodes along the ith dimension of the mesh. In FIG. 2A, the links indicated by solid lines belong to one dimension of the network, i.e., a "row" dimension, while the links indicated by broken lines belong to the other dimension of the network, i.e., a "column" dimension.

Also in FIG. 2A, the network topology defines four groups of nodes along the row dimension, i.e., nodes A1-A4; B1-B4; C1-C4; and D1-D4, and four groups of nodes along the column dimension, i.e., nodes A1-D1; A2-D2; A3-D3; and A4-D4. For networks having two-dimensional topologies, each group of nodes in the row dimension will be referred to as a row, and each group of nodes in the column dimension will be referred to as a column.

Figure 2B:
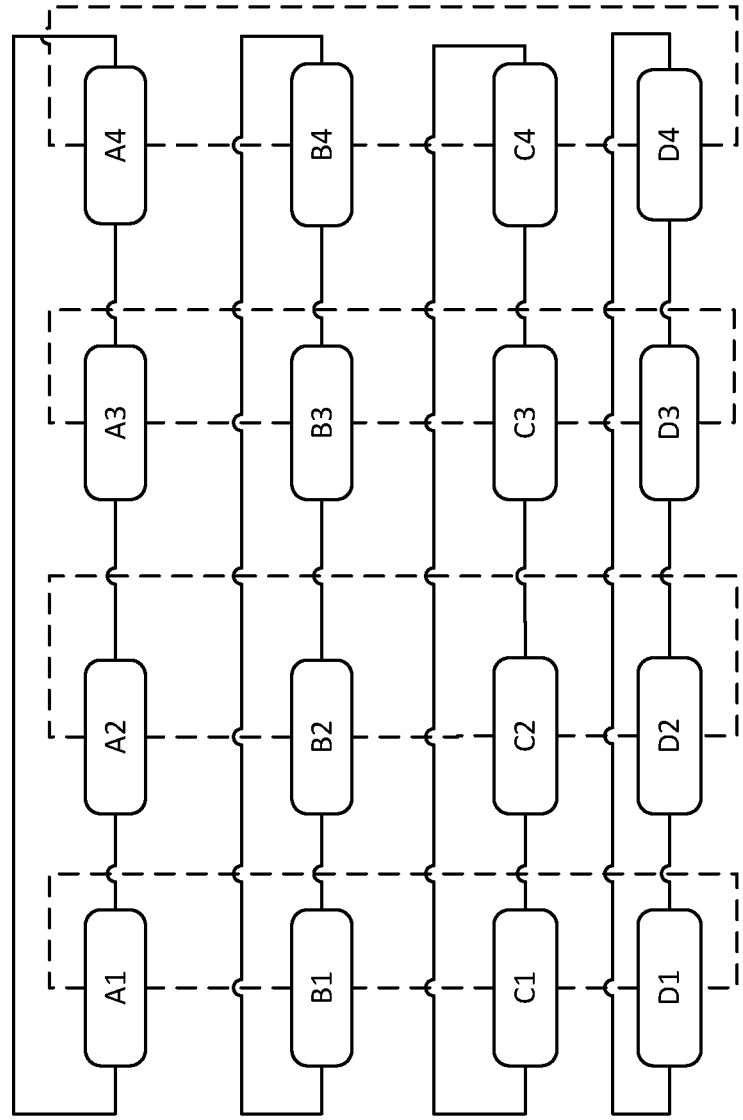
FIG. 2B illustrates a network with a two-dimensional torus topology.

FIG. 2B illustrates a network with a two-dimensional torus topology 200b. A two-dimensional torus consists of $k_1 * k_0$ nodes, where $k_i$ represents the number of nodes along one dimension of the torus. A two-dimensional torus consists of $n^2$ links, where n is the number of nodes of the torus. In addition to connecting a node to each neighboring node in the network 200b, a torus also connects nodes on opposite sides of the torus. In general, an m-dimensional torus having n nodes will have $n^m$ links. In FIG. 2B, the links indicated by solid lines belong to one dimension of the network, i.e., a "row" dimension, while the links indicated by broken lines belong to the other dimension of the network, i.e., a "column" dimension.

Also in FIG. 2B and similar to FIG. 2A, the network topology defines four rows of nodes, i.e., nodes A1-4; B1-B4; C1-C4; and D1-D4, and four columns of nodes along the column dimension, i.e., nodes A1-D1; A2-D2; A3-D3; and A4-D4.

Referring back to FIG. 1, the training system 100 can train each model replica 125a-n on a unique batch of training data partitioned by the partition engine 115. When a node has finished processing a batch of training data through a respective model replica, the node can generate an individual gradient vector for the values of the model parameters. Because the replicas are trained on different batches of training examples, the training system 100 can combine all of the individual gradient vectors generated by all of the replicas 125a-n and generate a final gradient vector. For example, the training system 100 can compute an average of every element in the individual gradient vectors to generate the final gradient vector representing an average gradient vector.

The training system 100 can use the final gradient vector to update the parameter values of the machine learning model. Then, the training system 100 can broadcast the new parameter values to each node 125a-n. If the training system 100 continues to train the machine learning replica network 120, each node 125a-n will process subsequent training examples through the respective model replica for the node using the updated parameter values.

The training system 100 can reduce the individual gradient vectors generated by the nodes for each respective replica 125a-n to generate the final gradient vector by any appropriate reduction algorithm that, when executed on the processing units 125a-n, causes the training system 100 to:

1. Sum each individual gradient vector;
2. Compute updated model parameter values from a final gradient vector computed from the sum of the individual gradient vectors; and 3. Broadcast, to every node in the replica network 120, the updated model parameter values for the machine learning model.

These operations can be collectively summarized as performing a reduction on the individual gradient vectors at each node in a replica network. The training system can perform a reduction of the nodes in the replica network 120. In this specification, the period in which the training system is executing a reduction along nodes in a dimension is referred to as the "critical phase" for that dimension.

A reduction of nodes refers to performing one or more operations on the group of nodes that receive the respective individual gradient vector of each node in the group, as input, and generates a single gradient vector, as output, thereby "reducing" the multiple individual gradient vectors to a single vector. For example, the training system can execute a reduction on a group of nodes to obtain a partial final gradient vector for that group. As described below, the training system can reduce partial final gradient vectors iteratively until reducing to a final gradient vector.

As discussed below in more detail, when the training system 100 trains a machine learning model with a replica network having one or more degraded nodes, the training system 100 can perform operations in both a "critical phase" as well as in a "forwarding phase" for each group of nodes along each dimension.

One example class of reduction algorithms for reducing the individual gradient vectors is circle reduction algorithms. In some implementations, the training system 100 can be configured to execute a circle reduction algorithm on the machine learning replica network 120. A detailed discussion of circle algorithms is provided in "PARALLEL PROCESSING OF REDUCTION AND BROADCAST OPERATIONS ON LARGE DATASETS OF NON-SCALAR DATA," U.S. Pat. No. 10,055,692, filed on Sep. 18, 2017, and incorporated herein by reference in its entirety.

FIGS. 3A-C illustrate an example reduction of a replica network having a three-dimensional mesh topology. In some implementations, the example reduction is a circle reduction according to a circle reduction algorithm. In general, for an n-dimensional network, a training system can perform n reductions to generate a final gradient vector.

At each dimension and for each group of nodes in the dimension, the training system can generate a respective partial final gradient vector, by performing a reduction.

A representative node can be selected to store the partial final gradient vector for the group, and the representative node for each group becomes part of a sub-network that is reduced along the next dimension. Specifically, the training system can reduce the sub-network of representative nodes by repeating the reduction process, to obtain a smaller sub-network of updated partial final gradient vectors and updated representative nodes. The training system can repeatedly reduce the replica network until only one group of representative nodes remains. Then, the training system can reduce the last group of representative nodes and obtain the final gradient vector for the replica network. An example follows.

FIG. 3A illustrates a replica network 300a having a three-dimensional mesh topology. Planes 305a-d in the replica network can be represented by a replica sub-network having a two-dimensional mesh topology. Similarly, each row or column of the planes 305a-d can be represented by a replica sub-network having a one-dimensional mesh topology.

A training system, e.g., the training system 100, can perform a first reduction on each group of nodes along the x dimension as shown by vectors 310a. The training system can perform a first reduction on each group in each plane 305a-d in parallel. After each first reduction, each group in the replica network 300a will have a representative node having the partial final gradient vector for that group, indicated by nodes with a diagonal hatch pattern in FIG. 3A, e.g., node 310a.

FIG. 3B illustrates a sub-network 300b of the replica network 300a having a two-dimensional mesh topology of representative nodes storing a partial final gradient vector after a first reduction. The training system can perform a second reduction on each group in the sub-network 300b to obtain, from the partial final gradient vectors of each representative node in the group, an updated partial final gradient vector. The training system can perform a second reduction on each group in sub-network 300b in parallel. After each second reduction, each group in the sub-network 300b can have a representative node storing the updated partial final gradient vector for that group, indicated by the shaded nodes, e.g., node 305b.

FIG. 3C illustrates a sub-network 300c of the replica network 300a having a one-dimensional mesh topology of representative nodes storing an updated partial final gradient vector after a second reduction. The training system can perform a third and final reduction on the group in sub-network 300c to obtain the final gradient vector, by reducing the respective updated partial gradient vector stored by each representative node in the sub-network 300c. After the third reduction, a representative node can store the final gradient vector for the replica network 300a. For example, node 305c can store the final gradient vector and update model parameters for the machine learning model trained by the replica network 300a. Then the node 305c can broadcast the updated model parameters to every node in the replica network 300a.

Although FIGS. 3A-C are described in terms of a representative node storing the partial final gradient vector for the group of nodes that the representative node belongs to, in some implementations each node in a group of nodes is updated with the partial final gradient vector.

Referring back to FIG. 1, some nodes of the nodes 125a-n can be degraded. A degraded node is a node that cannot generate an individual gradient vector or communicate an individual gradient vector to the training system 100 during a reduction. A node may be degraded because of a hardware issue, e.g., physical damage to a respective processing unit, hardware has been removed from the node for replacement or maintenance. A node can also be degraded because links between the node and other nodes are damaged. A node can also be degraded because of an issue with software installed in memory at the node, e.g., software glitch, a currently in-progress software update, or software maintenance at the node.

If links at a node are damaged, a node is said to be either completely degraded or partially degraded. If all links to the node are damaged such that data cannot be communicated to or from the node, then the node is said to be completely degraded. If some, but not all, links to a node are damaged, the node is said to be partially degraded. When a node is partially degraded, the node cannot communicate data along the dimension where the damaged links belong. A partially degraded node is only considered degraded along the dimensions having the damaged links. Therefore, a partially degraded node can be classified as degraded along one dimension, but not along another dimension.

The training system 100 can also be configured to classify nodes as degraded when the nodes are neighbored by only degraded nodes along every dimension of the replica network. In these cases, the node is considered degraded even if the node is otherwise capable of generating an individual gradient vector for a batch of training data.

Figure 4:
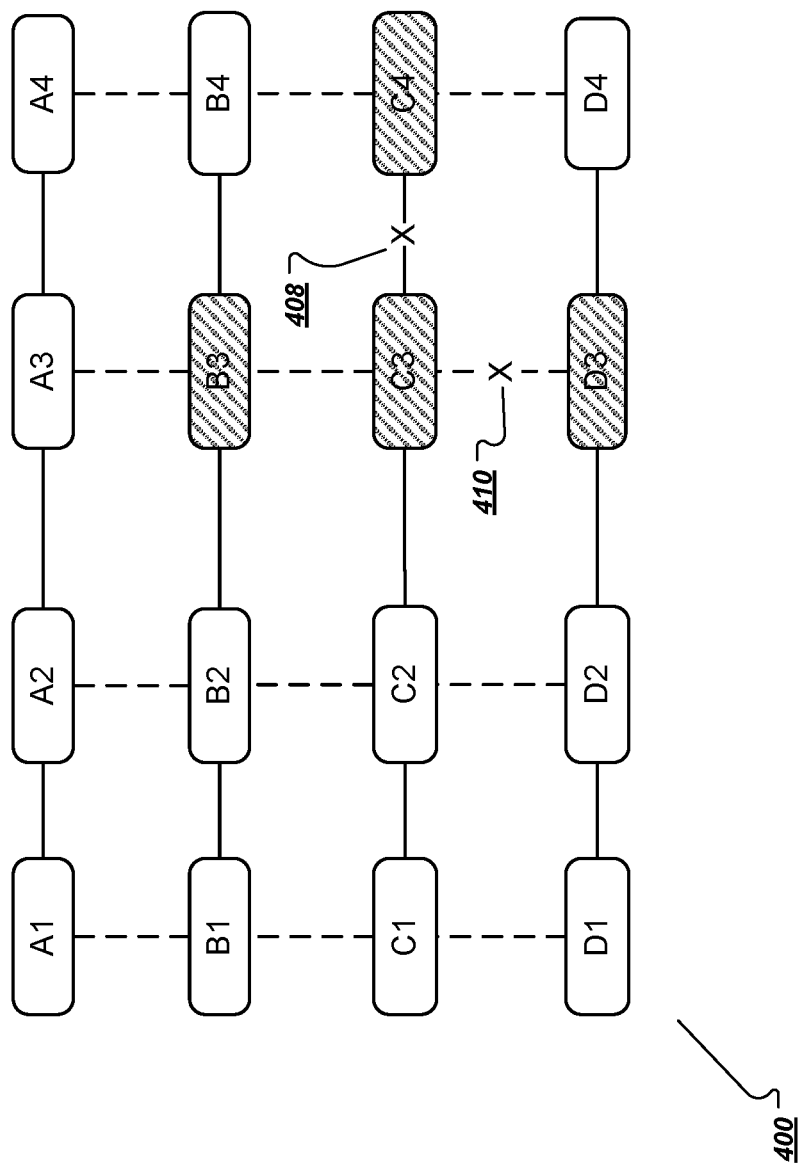
FIG. 4 illustrates an example replica network having degraded nodes.

FIG. 4 illustrates an example machine learning replica network 400 having degraded nodes. The replica network 400 has a two-dimensional mesh topology. Node B3 is a degraded node, indicated by the thatch marks in FIG. 4. Nodes C3, C4, and D3 are also degraded, because at least one of the links connected to the nodes are damaged, indicated by damaged links 408 and 410. Specifically, node C4 is partially degraded: node C4 is degraded along the row dimension of the replica network 400 because the row dimension has the damaged link 408, but the node C4 is not considered degraded along the column dimension.

On the other hand, node C3 is considered a completely degraded node: the node C3 is degraded along the row dimension because of the damaged link 408, and is also degraded along the column dimension because of the damaged link 410 connected to node C4.

Degraded nodes can be contiguous or non-contiguous. Contiguous degraded nodes are neighbors to one or more other degraded nodes in a group along a dimension. The training system 100 can be configured to identify a node as degraded when the node has only degraded nodes as neighbors, such that one could draw a continuous path from any one degraded node to another using only the links of degraded nodes. On the other hand, if the replica network has any degraded nodes in which a continuous path cannot be reached from any other degraded node in the replica network using only links from degraded nodes, then the replica network is said to have non-contiguous degraded nodes.

For example and referring to the replica network 400 of FIG. 4, nodes B3, C3, C4, and D3 are contiguous because a path can be drawn from any one degraded node to another degraded node, while visiting only other degraded nodes. However, if, for sake of example, node C1 were also degraded, then the degraded nodes would be considered non-contiguous, because there is no way to draw a path to C1 without visiting non-degraded nodes. As discussed in detail below, how the training system 100 trains a replica network with one or more degraded nodes can depend on whether or not the degraded nodes are contiguous.

In general, the training system 100 can train a replica network having one or more degraded nodes. The training system 100 can classify degraded nodes from non-degraded nodes. Then, the training system 100 can perform a sequence of "forwarding phase" operations and "critical phase" operations for each group of nodes in each dimension. As described above, critical phase operations include reduction operations. For example, each of the first, second, and third reductions discussed with respect to FIG. 3A-C formed part of the respective critical phase along each dimension.

On the other hand, forwarding phase operations include operations that when executed by a node, causes the node to forward a respective individual gradient vector to a non-degraded node. The receiving node can be configured to receive and compute a new individual gradient vector that reflects the individual gradient vector forwarded by the forwarding node, which in this specification is referred to as an intermediate gradient vector. The order and specific operations that the training system executes during the critical phase and forwarding phases vary from implementation to implementation, as discussed below.

To determine which groups of nodes should perform "critical phase" operations and which should perform "forwarding phase" operations, the training system can be configured to designate each group of nodes along a dimension as either a "forwarding group" or a "critical group." A "forwarding group" is a group of nodes that does not participate in the critical phase of the reduction along the dimension.

Instead, in some implementations, each non-degraded node in a forwarding group forwards its respective individual gradient vector to a non-degraded node in a critical group, i.e., a group of nodes designated to participate in the critical phase along the dimension. In some implementations and as discussed below, the training system can form "sub-networks" of non-degraded nodes in forwarding groups and compute a final gradient vector (called an "internal" gradient vector) for each sub-network, before forwarding the internal gradient vector to a non-degraded node in a critical group.

Because a partially degraded node is defined as degraded or non-degraded on a dimension-by-dimension basis, a partially degraded node can be, for example, part of a forwarding group along one dimension, but be part of a critical group along another dimension.

In some implementations, the system can identify a partially degraded node as completely degraded for purposes of designating the group the node is in as a "forwarding group" or a "critical group." This means that, regardless of whether the partially degraded node is degraded along a respective dimension, the system can always identify the node as a completely degraded node. Because a partially degraded node may be susceptible to further degradation, the system can be configured to identify the node as completely degraded as a preventative measure against including the node to perform a critical operation. By routing around degraded nodes, the training system can improve the processing of replica networks with varying levels of degradation. The training system can distribute performing the operations in both the forwarding and critical phases to make use of the distributed nature of the replica network. In addition, by distributing the gradient vectors and subsequent processing across nodes in the replica network, the training system can mitigate further degradation, as a result of "hotspots" on the physical components of the replica network, caused by uneven distribution of computation tasks. As described below, the training system can be configured to perform reductions on replica networks of arbitrary dimension.

The training system 100 can classify nodes as degraded by testing the quality of the components of each node and link, in any appropriate manner. For example, each node can be configured to receive and respond to a status request sent by the training system 100. If the training system 100 does not receive a response to a status request within a predetermined period of time, the training system 100 can classify that node as degraded.

As another example, the training system can send a status request along each link connecting respective neighboring nodes along a dimension. Similarly, if the training system does not receive a response to the status request sent to a node along a particular link, the training system 100 can classify the node as degraded along the dimension having that particular link. In this example, the training system can receive responses to status requests for nodes for requests sent along some links connecting the node, but not others. Therefore, the training system 100 classifies the node as partially degraded along the dimensions having the damaged or unresponsive links.

Next, the training system can designate each group of nodes as either a forwarding group or a critical group of nodes. As discussed above, the designation of each group can vary from implementation to implementation.

In the forwarding phase of some implementations, the training system designates every group of nodes along a dimension and having a degraded node as a forwarding group of nodes. In implementations where forwarding groups of nodes do include degraded nodes, the training system designates all other groups as critical groups of nodes.

Each non-degraded node in a forwarding group computes a respective individual gradient vector for a batch of training data, and forwards the respective individual gradient vector to a non-degraded node in a critical group of nodes. Then, the non-degraded nodes receiving the forwarded individual gradient vectors computes an intermediate gradient vector from the individual gradient vector of the receiving node and the forwarded individual gradient vector. The receiving node updates its individual gradient vector as the intermediate gradient vector. The training system can then compute a reduction along each critical group of nodes for the dimension, as discussed above with respect to FIGS. 3A-C.

Because the non-degraded nodes in the forwarding groups have already forwarded their respective individual gradient vectors, the reduction along the dimension is performed on groups having only non-degraded nodes. As discussed above with respect to FIGS. 3A-C, each critical group can have a representative node that stores the partial final gradient vector for the critical group. The training system 100 can be configured to broadcast the respective partial final gradient vector for each critical group to each node in the group. Then, the training system 100 can perform subsequent reductions by repeating operations for the forwarding and critical phase for groups along subsequent dimensions.

After performing the forwarding and critical phase operations along each dimension, the training system can compute updated model parameter values from the final gradient vector and broadcast the updated model parameter values to each non-degraded node in the replica network, including the nodes of each forwarding group for each dimension.

Figure 5A:
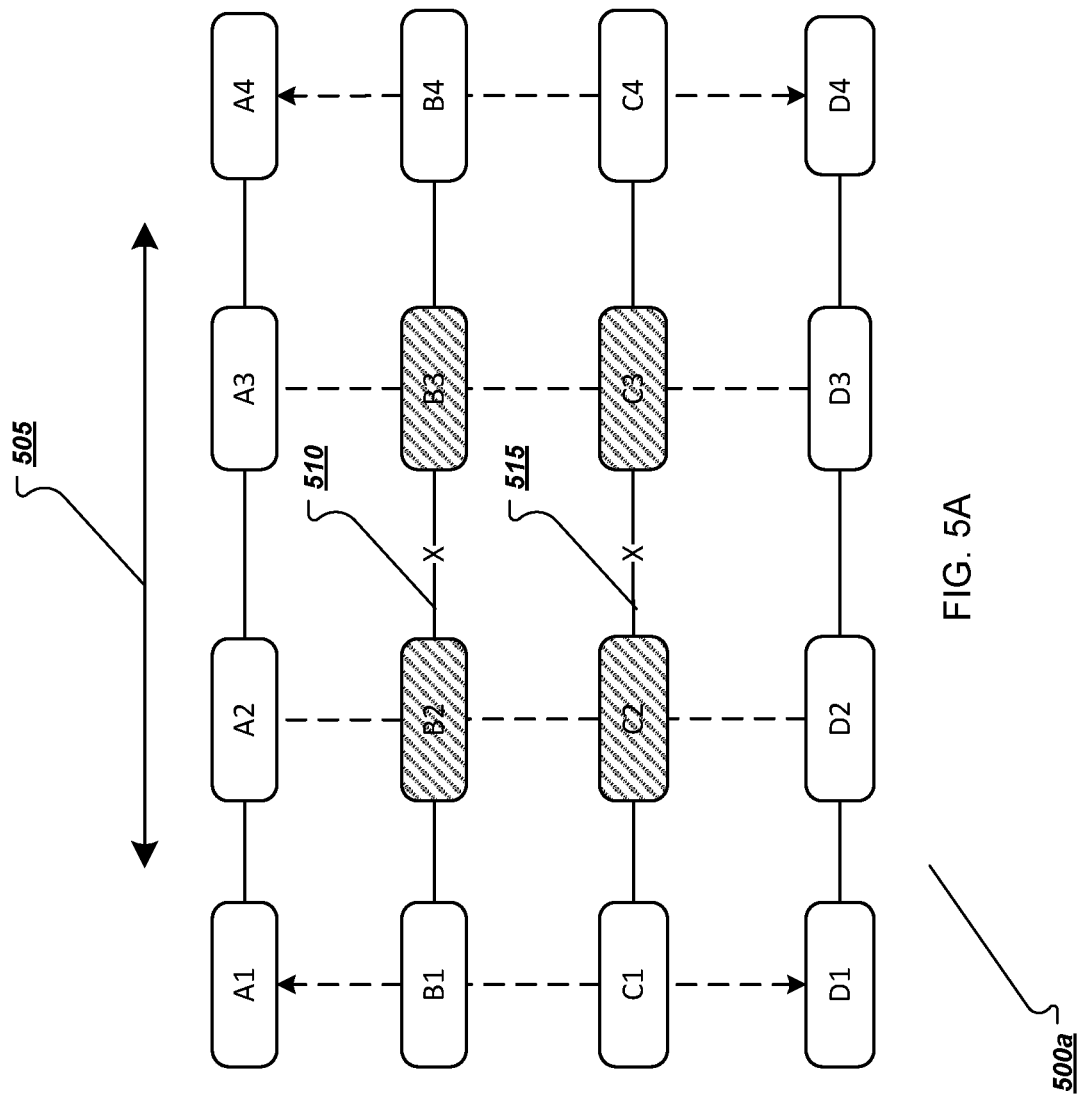
FIG. 5A illustrates an example replica network with partially degraded nodes.
Figure 5B:
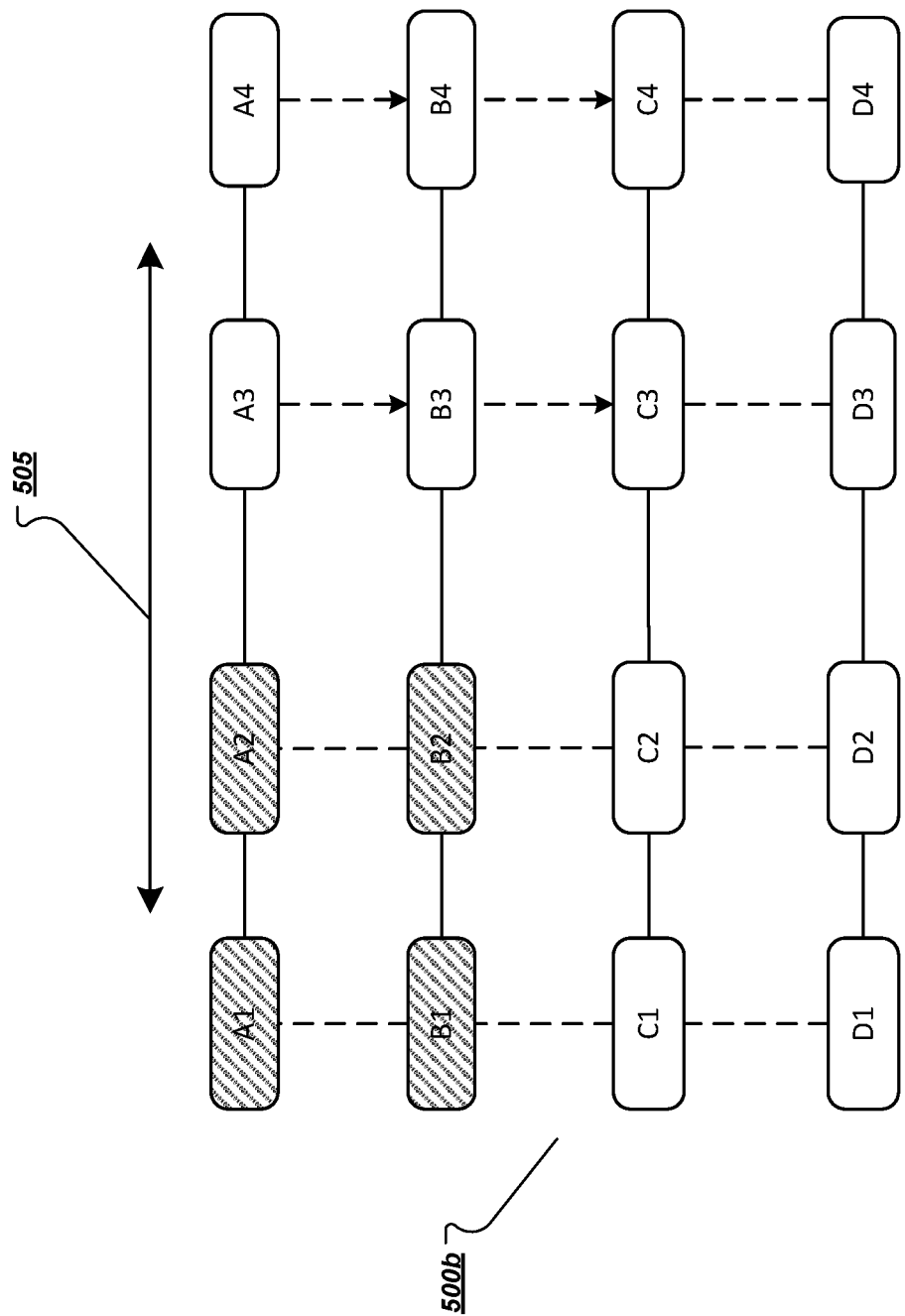
FIG. 5B illustrates an example replica network with degraded nodes in one corner of the network.
Figure 5C:
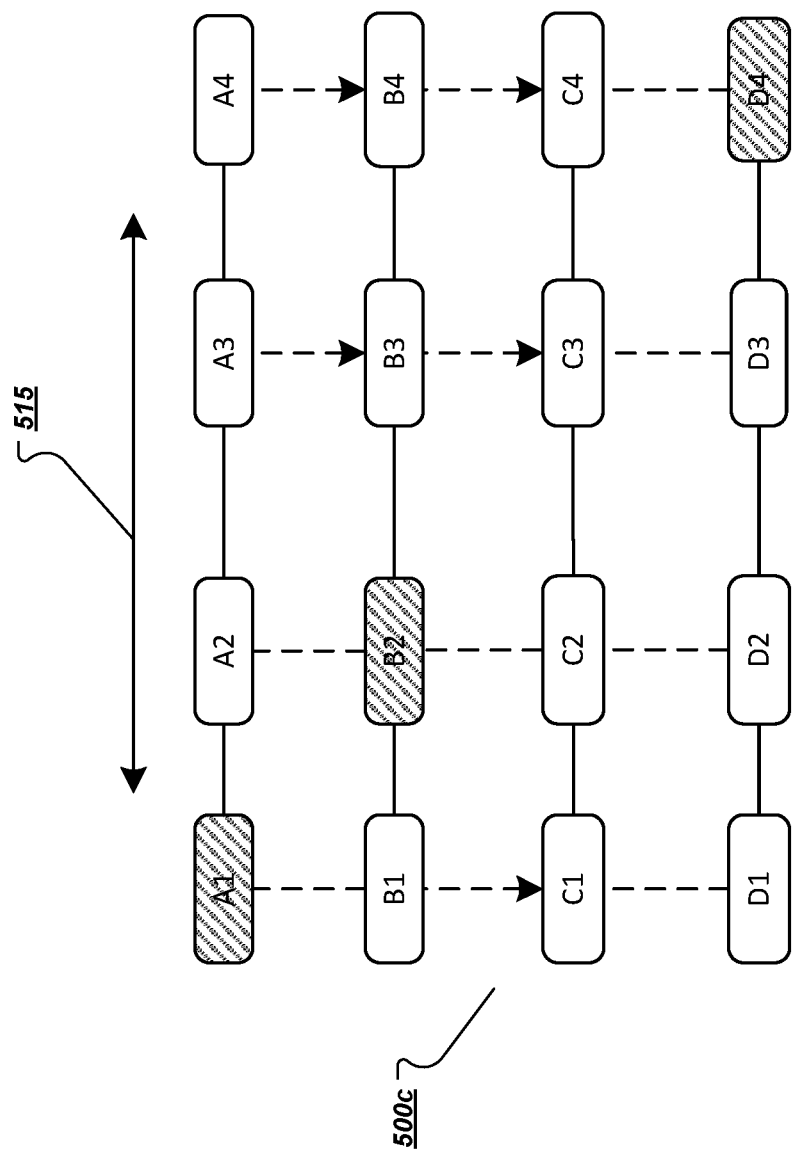
FIG. 5C illustrates an example replica network with multiple non-contiguous degraded nodes.

FIGS. 5A-C illustrate training replica networks 500a-c with a two-dimensional mesh topology and having degraded nodes. In some implementations, the training system trains the replica networks 500a-c having degraded nodes by designating each group of nodes along a dimension as a forwarding group when the group includes one or more degraded nodes.

FIG. 5A illustrates an example replica network 500a with partially degraded nodes. For example, in FIG. 5A, rows "B" and "C" are forwarding groups, because of degraded nodes B2, B3, C2, and C3. Therefore, the non-degraded nodes B1, C1, B4, and C4 can compute respective individual gradient vectors, and forward the individual gradient vectors to a receiving node in a critical group. In the replica network 500a, rows "A" and "D" are considered critical groups. C1 forwards its respective individual gradient vector to D1; B1 forwards to A1; B4 forwards to A4; and C4 forwards to D4. In some cases, the forwarding node will have to forward the individual gradient vector through more than one node before arriving a node in a critical group. In other cases, multiple nodes can forward their respective individual gradient vector to the same receiving node. Lastly, in some cases, the forwarding node may not be able to forward its individual gradient vector to any receiving node.

Once every forwarding node has forwarded its respective individual gradient vector to a receiving node, each receiving node can compute an intermediate gradient vector.

Note that in FIG. 5A the degraded nodes are only partially degraded along the row dimension. To avoid the degraded links 510 and 515, the training system can be configured to perform a reduction in the column dimension first. In some implementations, the training system can be configured to determine, from multiple dimensions, which dimension has the fewest degraded nodes. Then, the training system can perform a reduction along that dimension.

FIG. 5B illustrates an example replica network 500b with degraded nodes in one corner of the network. FIG. 5B illustrates degraded nodes A1, A2, B1, and B2, and also illustrates the training system computing a reduction along the row dimension of the replica network 500b, indicated by horizontal arrow 510. During the forwarding phase, nodes A3 and B3 forward their respective individual gradient vectors to node C3, while nodes A4 and B4 forward their respective gradient vectors to node C4. As discussed above, nodes A3, B3, A4, and B4 are forwarding nodes because these nodes are non-degraded and belong to respective groups of nodes having degraded nodes.

Nodes C3 and C4 of the replica network 500b can then compute respective intermediate gradient vectors. Specifically, node C3 computes an intermediate gradient vector between its own individual gradient vector, as well as the forwarded gradient vectors of A3 and B3. Similarly, node C4 can compute an intermediate gradient vector from its own individual gradient vector, as well as the forwarded gradient vectors of A4 and B4. Then, the training system can execute the operations in the critical phase on critical groups "C" and "D" and obtain a respective partial final gradient vector for each row.

The training system can also train a replica network having multiple degraded nodes that are non-contiguous.

FIG. 5C illustrates an example replica network 500c with multiple non-contiguous degraded nodes. FIG. 5C illustrates degraded nodes A1, B2, and D4, and also illustrates the training system computing a reduction along the row dimension of the replica network 500c, indicated by horizontal arrow 515. First, the training system 100 can determine whether the replica network 500c includes non-contiguous degraded nodes.

If the replica network 500c does include non-contiguous degraded nodes, then the training system 100 can identify whether there is a group along the row dimension that does not have any degraded nodes. In the replica network 500c, row "C" is a group without any degraded nodes. In some implementations, the training system can determine which dimension to reduce along first, based on the presence of a group having only non-degraded nodes. For example, if the training system 100 does not identify a group of non-degraded nodes along one dimension, then the training system 100 can analyze groups along other dimensions of the replica network until finding a group of non-degraded nodes.

During the forwarding phase, nodes B1 and D1 of the replica network 500c forward their respective individual gradient vectors to node C1; nodes A3, B3, and D3 forward to node C3; and nodes A4 and B4 forward to node C4. Then, nodes C1, C3, and C4 compute respective intermediate gradient vectors, as discussed above with reference to FIGS. 5A-B. Then, the training system 100 can execute the critical phase on row "C" to generate a final gradient vector for the replica network 500c.

As discussed above, the training system 100 can be configured to compute internal reductions of sub-networks of non-degraded nodes in forwarding groups. The nodes of each sub-network can forward a respective internal gradient vector to a respective receiving non-degraded node in a critical group. Each receiving node can generate an intermediate gradient vector using its own individual gradient vector and the received internal gradient vector of the sub-network. Then, each receiving node can update its respective individual gradient vector with the computed intermediate gradient vector, and the training system 100 can perform a reduction along the dimension for each critical group of nodes.

Figure 6:
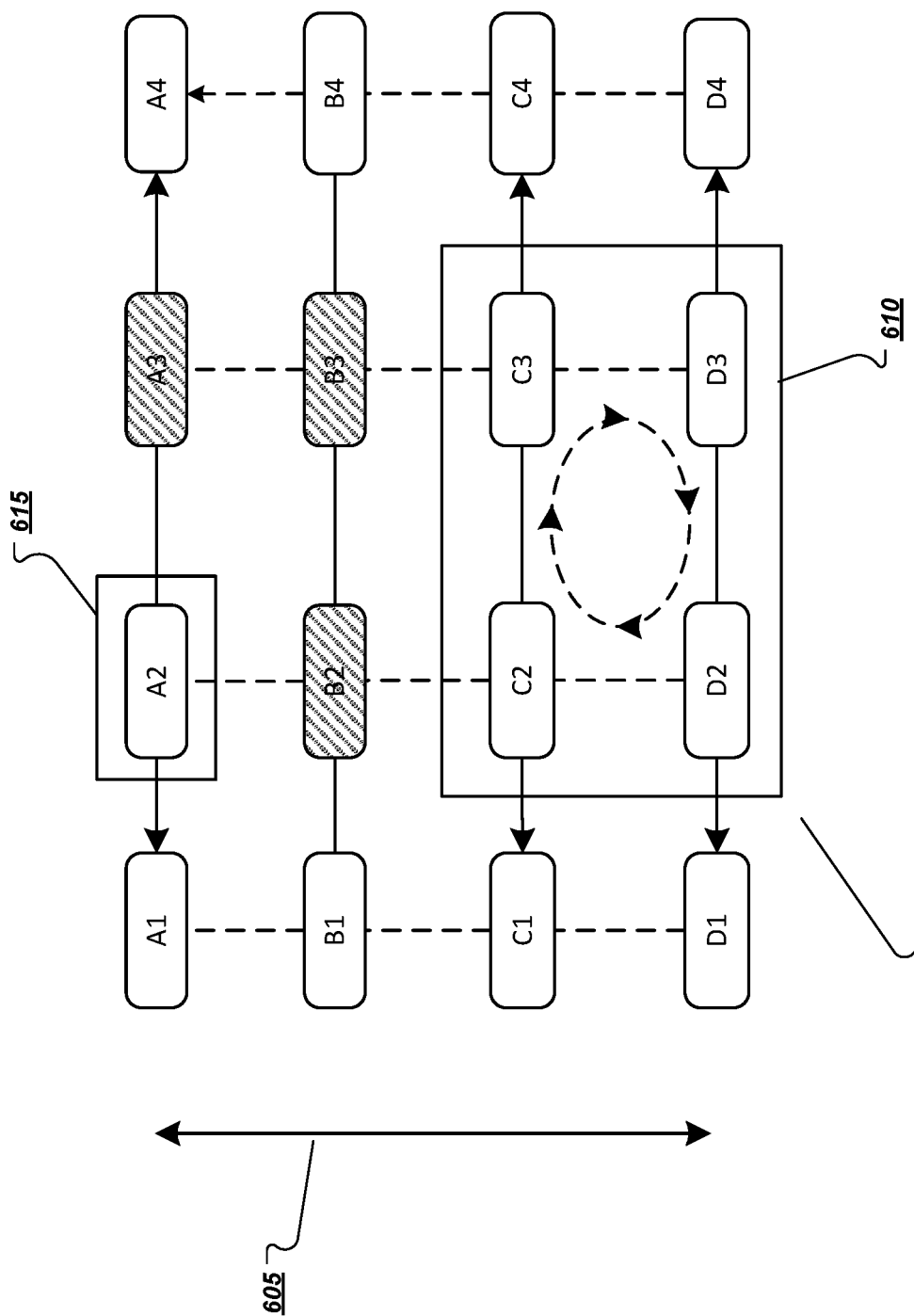
FIG. 6 illustrates an example replica network with contiguous degraded nodes.

FIG. 6 illustrates an example replica network 600 with contiguous degraded nodes. FIG. 6 illustrates degraded nodes B2, A3, and B3, and also illustrates the training system performing a reduction along the column dimension of the replica network 500c, indicated by vertical arrow 515. First, the training system can classify each group along the column dimension as having degraded nodes or not. In the replica network 600a, the "2" column and the "3" column include degraded nodes and are therefore designated as forwarding groups.

Next, the training system 100 can perform an internal reduction of sub-networks of contiguous non-degraded nodes in each forwarding group. To do this, the training system 100 can identify sub-networks of nodes. Each sub-network of nodes contains only non-degraded nodes across one or more forwarding groups.

For example in FIG. 6, the training system 100 can form sub-network 610, which includes contiguous nodes C2, C3, D2, and D3. Each node in the sub-network 610 is a non-degraded node in a forwarding group, i.e., column "2" and column "3". Because nodes C2, C3, D2, and D3 are contiguous, the training system 100 can form a sub-network from all four nodes. In some implementations, the training system 100 is configured to generate sub-networks of different sizes. For example, for the four nodes C2, C3, D2, and D3, the training system can form four sub-networks of size 1, two sub-networks of size 2, or one sub-network of size 1 and one sub-network of size 3.

Also in FIG. 6A, the training system 100 can form a second sub-network 615 from node A2. The training system forms the sub-network 615 including only node A2 because A2 is not contiguous with any non-degraded nodes in a forwarding group. The training system 100 can repeat this process of forming sub-networks until every non-degraded node in every forwarding group is part of a respective sub-network.

After forming the sub-networks, the training system 100 can cause the nodes to compute an internal gradient vector for each sub-network. An internal gradient vector is a final gradient vector for the sub-network. The training system 100 can generate the internal gradient vector using any technique described for reducing a replica network, as discussed above with reference to FIGS. 3A-C. In the replica network 600a, the training system 100 can compute an internal gradient vector for the sub-networks 610 and 615.

After computing the internal gradient vector for each sub-network, the training system can cause the nodes of each sub-network to forward a respective internal gradient vector to a non-degraded node in a critical group. In the replica network 600a, the nodes of the sub-network 610 forward the internal gradient vector for the sub-network 610 to nodes C1, D1, C4, and D4. Similarly, node A2 forwards the internal gradient vector for the sub-network 615 to node A1.

After forwarding the internal gradient vectors, the nodes receiving the internal gradient vectors generate an intermediate gradient vector for the node, from the respective individual gradient vector and the received internal gradient vector. Then, each receiving node updates a respective individual gradient vector with the generated intermediate gradient vector. In the replica network 600a, the nodes A1, C1, D1, C4, and D4 update respective individual gradient vectors with computed intermediate gradient vector.

Finally, the training system can compute a partial final gradient vector for each critical group along the dimension. In the replica network 600a, the training system 100 computes a reduction for column "1" and column "4". A single representative node can be updated with the respective partial final gradient vector for the group, and the training system 100 can repeat the reduction process along the next dimension.

Although the example replica networks in FIGS. 5A-C and 6 have been networks defining two-dimensional mesh topologies, the training system 100 can also be configured to perform reductions on a replica network having a torus topology. When a replica network defines a torus topology, the training system additionally considers the wrap-around links between nodes on opposite ends of the replica network in determining contiguous degraded or non-degraded nodes.

Figure 7:
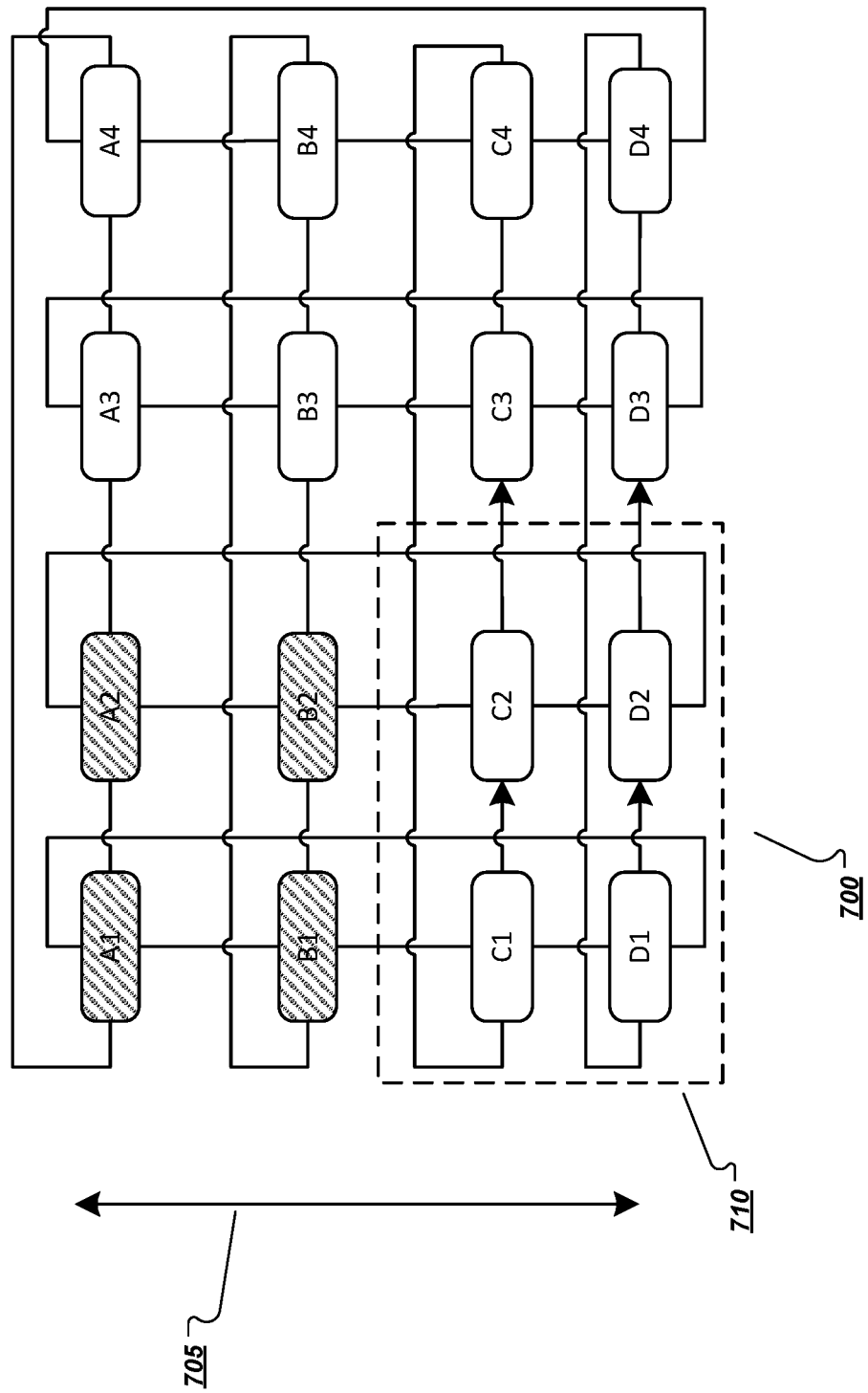
FIG. 7 illustrates an example replica network having a torus topology and degraded nodes.

FIG. 7 illustrates an example replica network 700 having a torus topology and degraded nodes. FIG. 7 illustrates degraded nodes A1, A2, B1, and B2, and also illustrates the training system computing a reduction along the column dimension of the replica network 700, indicated by vertical arrow 705. The training system 100 can compute the final gradient vector by first designating columns "1" and "2" as forwarding groups. Then the non-degraded nodes of the forwarding groups, i.e., nodes C1, C2, D1, and D2, can forward the individual gradient vectors of the non-degraded nodes in the groups having degraded nodes and computing an intermediate gradient vector at receiving nodes C3 and D3.

In some implementations, and as discussed above with respect to FIG. 6, the training system can identify a sub-network of nodes in the replica network 700 and first compute an internal gradient vector of that sub-network. In the replica network 700, a sub-network 710 can include the four non-degraded nodes C1, C2, D1, and D2. The training system can compute the internal gradient vector for the sub-network 710 and nodes C2 and D2 can forward the internal gradient vector to neighboring nodes C3 and D3.

Figure 8:
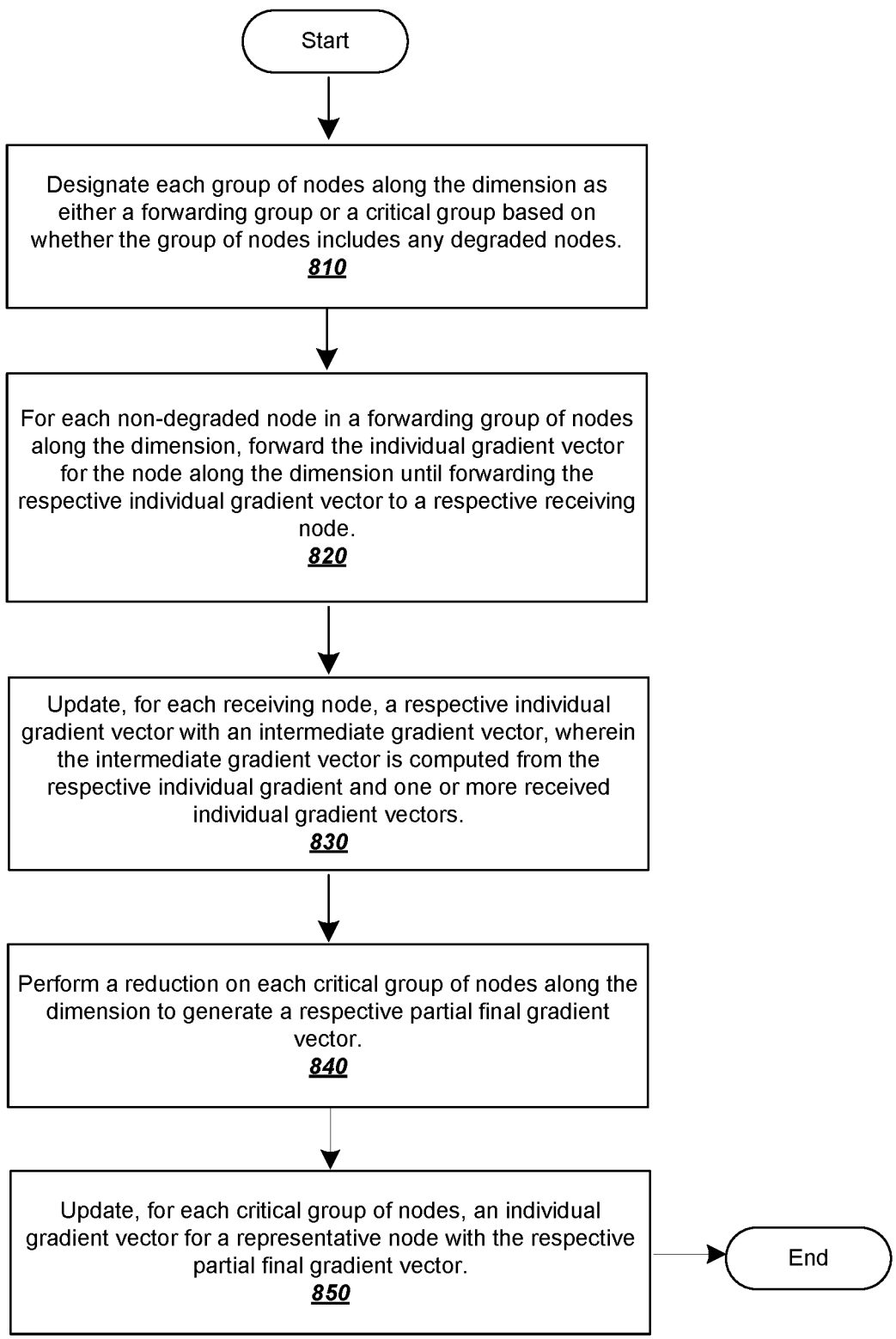
FIG. 8 is a flow chart of an example process for computing a final gradient vector for a replica network having degraded nodes.

FIG. 8 is a flow chart of an example process 800 for computing a final gradient vector for a replica network having degraded nodes. For convenience, the example process will be described as being performed by a system of one or more computers, located in one or more locations, and programmed appropriately in accordance with this specification. For example, a training system, e.g., the training system 100 of FIG. 1, appropriately programmed, can perform the example process of FIG. 8. One iteration of the example process 800 along a dimension is described. As discussed above, the training system can generate a partial final gradient vector for every dimension of a replica network, until computing a final gradient vector.

The training system designates each group of nodes along the dimension as either a forwarding group or a critical group based on whether the group of nodes includes any degraded nodes (810). The training system can designate a group as a forwarding group or a critical group according to the presence or absence of degraded nodes in the group. As discussed above with reference to FIG. 6, in some implementations, the training system designates one or more sub-networks of non-degraded nodes across one or more forwarding groups.

For each non-degraded node in a forwarding group of nodes along the dimension, the training system forwards the individual gradient vector for the node along the dimension until forwarding the respective individual gradient vector to a respective receiving node in a respective critical group of nodes along the dimension (820). As discussed above with reference to FIGS. 5A-C, non-degraded nodes in forwarding groups can forward their respective individual gradient vectors to non-degraded nodes not in a forwarding group.

The training system updates, for each receiving node, a respective individual gradient vector with an intermediate gradient vector, wherein the intermediate gradient vector is computed from the respective individual gradient and one or more received individual gradient vectors (830). The non-degraded nodes receiving the individual gradient vectors can generate an intermediate gradient vector and the training system can compute a reduction along the dimension without the nodes in the forwarding group. As discussed above with reference to FIGS. 5A-C and 6, in some implementations the training system can compute an internal reduction for a sub-network of non-degraded nodes, before the non-degraded nodes forward the respective internal gradient vector for the sub-network to a receiving node.

The training system performs a reduction on each critical group of nodes along the dimension to generate a respective partial final gradient vector (840). If the training system is performing a reduction on a replica network having only one dimension, then the partial final gradient vector is the final gradient vector for the replica network.

The training system updates, for each critical group of nodes, an individual gradient vector for a representative node with the respective partial final gradient vector (850). As discussed above with respect to FIG. 3, the sub-network representing all of the nodes with respective partial final gradient vectors has a dimensionality of one less than the replica network in which the partial final gradient vectors was computed. For example, if the replica network defines a three-dimensional mesh topology, the partial final gradient vectors are represented by nodes defining a two-dimensional mesh topology.

The training system repeats the operations for a next dimension on a sub-network comprising only the representative nodes, until generating the final gradient vector (860). Using the final gradient vector, the training system can update the model parameter values of the machine learning model with the final gradient vector before broadcasting the updated model parameter values to each non-degraded node.

Figure 9:
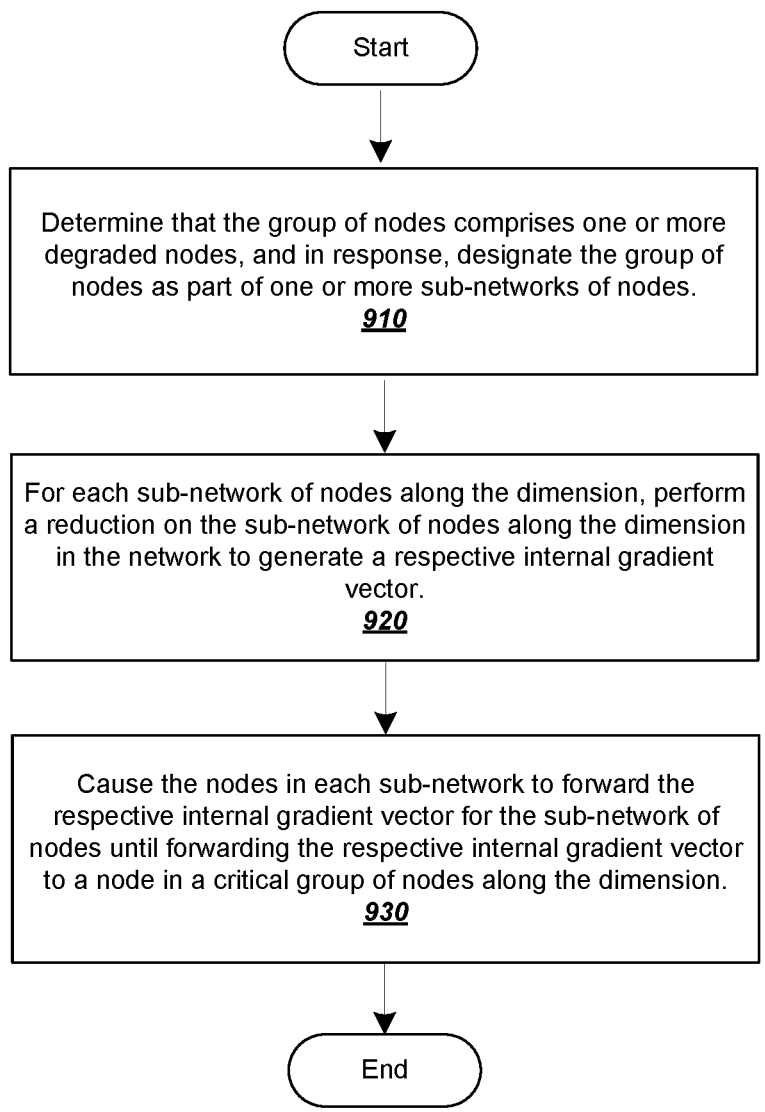
FIG. 9 is a flow chart of an example process for performing internal reductions on sub-networks of non-degraded nodes.

FIG. 9 is a flow chart of an example process for performing internal reductions on sub-networks of non-degraded nodes. For convenience, the example process will be described as being performed by a system of one or more computers, located in one or more locations, and programmed appropriately in accordance with this specification. For example, a training system, e.g., the training system 100 of FIG. 1, appropriately programmed, can perform the example process of FIG. 9.

The training system determines that the group of nodes comprises one or more degraded nodes, and in response, designates the group of nodes as part of one or more sub-networks of nodes, wherein the one or more sub-networks of nodes exclude the one or more degraded nodes (step 910). As discussed above with reference to FIG. 6, a sub-network includes contiguous non-degraded nodes of one or more forwarding groups.

The training system performs, for each sub-network of nodes along the dimension, a reduction on the sub-network of nodes along the dimension in the network to generate a respective internal gradient vector (step 920). As discussed above with reference to FIG. 6, the internal gradient vector is a final gradient vector for the sub-network of nodes.

The training system causes the nodes in each sub-network to forward the respective internal gradient vector for the sub-network of nodes until forwarding the respective internal gradient vector to a node in a critical group of nodes along the dimension, wherein the node is not in a sub-network of nodes (step 930). The receiving nodes can update their respective individual gradient vectors with a respective intermediate gradient vector.

The processes and logic flows described in this specification can be performed by one or more programmable computers executing one or more computer programs to perform functions by operating on instance data and generating output. Although the specification specifically refers to processing units processing gradient vectors, processing units can process perform reduction processing on any non-scalar instance data, i.e., tensors, matrices, arrays, or any other data structure that can hold data that can be sliced and processed in parallel. The processes and logic flows can also be performed by special purpose logic circuitry, e.g., an FPGA or an ASIC, or by a combination of special purpose logic circuitry and one or more programmed computers.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method for parallel processing training data, the method comprising: training a respective replica of a machine learning model on each node of multiple nodes organized in an n-dimensional network topology, wherein n is an integer greater than or equal to 1, wherein a plurality of the multiple nodes are trained on a respective batch of training data in parallel, wherein one or more nodes in the plurality of nodes have been classified as degraded, and wherein each non-degraded node stores a respective individual gradient vector resulting from training the respective replica for the node on the respective batch of training data; and combining the respective individual gradient vectors in the nodes to generate a final gradient vector by performing operations comprising, for a dimension of n dimensions in the network topology: designating each group of nodes along the dimension as either a forwarding group or a critical group based on whether the group of nodes includes any degraded nodes, for each non-degraded node in a forwarding group of nodes along the dimension, forwarding a respective individual gradient vector for the node along the dimension until forwarding the respective individual gradient vector to a respective receiving node in a respective critical group of nodes along the dimension, updating, for each receiving node, a respective individual gradient vector with an intermediate gradient vector, wherein the intermediate gradient vector is computed from the respective individual gradient vector and one or more received individual gradient vectors, performing a reduction on each critical group of nodes along the dimension to generate a respective partial final gradient vector for the critical group, and updating, for each critical group of nodes, an individual gradient vector for a representative node with the respective partial final gradient vector.

Embodiment 2 is the method of embodiment 1, wherein the dimension is a first dimension, wherein combining the respective individual gradient vectors in the nodes to generate the final gradient vector comprises performing the operations for each dimension of the n-dimensional network topology, including the first dimension, and wherein the method further comprises repeating the operations for a next dimension on a sub-network comprising only the representative nodes, until generating the final gradient vector.

Embodiment 3 is the method of any one of embodiments 1-2, further comprising: updating model parameter values of the machine learning model with the final gradient vector; and broadcasting the updated model parameter values to each non-degraded node.

Embodiment 4 is the method of any one of embodiments 1-3, wherein designating each group of nodes in multiple groups of nodes in each dimension as a forwarding group of nodes or a critical group of nodes, based on the presence of one or more degraded nodes in the group of nodes, comprises: determining that the group of nodes comprises one or more degraded nodes, and in response, designating the group of nodes as a forwarding group of nodes.

Embodiment 5 is the method of any one of embodiments 1-4, wherein designating each group of nodes in multiple groups of nodes in each dimension as a forwarding group of nodes or a critical group of nodes, based on the presence of one or more degraded nodes in the group of nodes, comprises: determining that the group of nodes comprises one or more degraded nodes, and in response, designating the group of nodes as part of one or more sub-networks of nodes, wherein the one or more sub-networks of nodes exclude the one or more degraded nodes.

Embodiment 6 is the method of any one of embodiments 1-5, wherein the reduction is a first reduction, and the method further comprising, for each sub-network of nodes: performing, for each sub-network of nodes along the dimension, a second reduction on the sub-network of nodes to generate a respective internal gradient vector; and forwarding the respective internal gradient vector for each sub-network of nodes until forwarding the internal gradient vector to a node in a critical group of nodes along the dimension.

Embodiment 7 is the method of any one of embodiments 1-6, wherein the network topology is a mesh topology.

Embodiment 8 is the method of any one of embodiments 1-6, wherein the network topology is a torus topology.

Embodiment 9 is the method of any one of embodiments 1-8, further comprising: determining that a particular node is not degraded and that every neighboring node of the particular node is degraded along a particular dimension; and in response, indicating that the particular node is degraded along the particular dimension.

Embodiment 10 is the method of any one of embodiments 1-9, wherein performing a reduction on each critical group of nodes along the dimension to generate a respective partial final gradient vector comprises performing a circle reduction on each critical group of nodes.

Embodiment 11 is a system comprising: one or more computers and one or more storage devices storing instructions that are operable, when executed by the one or more computers, to cause the one or more computers to perform the method of any one of embodiments 1-10.

Embodiment 12 is a computer storage medium encoded with a computer program, the program comprising instructions that are operable, when executed by data processing apparatus, to cause the data processing apparatus to perform the method of any one of embodiments 1-10.

While this specification contains many specific implementation details, these should not be construed as limitations on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for parallel processing training data, the method comprising:

training a respective replica of a machine learning model on each node of multiple nodes organized in an n-dimensional network topology, wherein n is an integer greater than or equal to 1, wherein a plurality of the multiple nodes are trained on a respective batch of training data in parallel, wherein one or more nodes in the plurality of the multiple nodes have been classified as degraded, and wherein each non-degraded node stores a respective individual gradient vector resulting from training the respective replica for the node on the respective batch of training data; and combining the respective individual gradient vectors in the nodes to generate a final gradient vector by performing operations comprising, for a dimension of n dimensions in the network topology:

designating each group of nodes along the dimension as either a forwarding group or a critical group based on whether the group of nodes includes any degraded nodes, comprising:
  designating, as a forwarding group, each group of nodes along the dimension that includes one or more degraded nodes and one or more non-degraded nodes, and
  designating, as a critical group, each group of nodes along the dimension that does not include any degraded nodes,
for each non-degraded node in a forwarding group of nodes along the dimension, forwarding a respective individual gradient vector for the node along the dimension until forwarding the respective individual gradient vector to a respective receiving node in a respective critical group of nodes along the dimension,
updating, for each receiving node, a respective individual gradient vector with an intermediate gradient vector, wherein the intermediate gradient vector is computed from the respective individual gradient vector and one or more received individual gradient vectors,
performing a reduction on each critical group of nodes along the dimension to generate a respective partial final gradient vector for the critical group, and
updating, for each critical group of nodes, an individual gradient vector for a representative node with the respective partial final gradient vector.

2. The method of claim 1,
wherein the dimension is a first dimension,
wherein combining the respective individual gradient vectors in the nodes to generate the final gradient vector comprises performing the operations for each dimension of the n-dimensional network topology, including the first dimension, and
wherein the method further comprises repeating the operations for a next dimension on a sub-network comprising only the representative nodes, until generating the final gradient vector.

3. The method of claim 2, further comprising:
updating model parameter values of the machine learning model with the final gradient vector; and
broadcasting the updated model parameter values to each non-degraded node.

4. The method of claim 1, wherein designating each group of nodes in multiple groups of nodes in each dimension as a forwarding group of nodes or a critical group of nodes, based on the presence of one or more degraded nodes in the group of nodes, comprises:
determining that the group of nodes comprises one or more degraded nodes, and in response, designating the group of nodes as a forwarding group of nodes.

5. The method of claim 1, wherein designating each group of nodes in multiple groups of nodes in each dimension as a forwarding group of nodes or a critical group of nodes, based on the presence of one or more degraded nodes in the group of nodes, comprises:
determining that the group of nodes comprises one or more degraded nodes, and in response, designating the group of nodes as part of one or more sub-networks of nodes, wherein the one or more sub-networks of nodes exclude the one or more degraded nodes.

6. The method of claim 5, wherein the reduction is a first reduction, and the method further comprising, for each sub-network of nodes:

performing, for each sub-network of nodes along the dimension, a second reduction on the sub-network of nodes to generate a respective internal gradient vector; and
forwarding the respective internal gradient vector for each sub-network of nodes until forwarding the internal gradient vector to a node in a critical group of nodes along the dimension.

7. The method of claim 1, wherein the network topology is a mesh topology.

8. The method of claim 1, wherein the network topology is a torus topology.

9. The method of claim 1, further comprising:
determining that a particular node is not degraded and that every neighboring node of the particular node is degraded along a particular dimension; and
in response, indicating that the particular node is degraded along the particular dimension.

10. The method of claim 1, wherein performing a reduction on each critical group of nodes along the dimension to generate a respective partial final gradient vector comprises performing a circle reduction on each critical group of nodes.

11. A system comprising:
one or more computers and one or more storage devices on which are stored instructions that are operable, when executed by the one or more computers, to cause the one or more computers to perform operations for parallel processing training data, the operations comprising:
training a respective replica of a machine learning model on each node of multiple nodes organized in an n-dimensional network topology, wherein n is an integer greater than or equal to 1,
wherein a plurality of the multiple nodes are trained on a respective batch of training data in parallel,
wherein one or more nodes in the plurality of the multiple nodes have been classified as degraded, and
wherein each non-degraded node stores a respective individual gradient vector resulting from training the respective replica for the node on the respective batch of training data; and
combining the respective individual gradient vectors in the nodes to generate a final gradient vector by performing operations comprising, for a dimension of n dimensions in the network topology:
  designating each group of nodes along the dimension as either a forwarding group or a critical group based on whether the group of nodes includes any degraded nodes, comprising:
    designating, as a forwarding group, each group of nodes along the dimension that includes one or more degraded nodes and one or more non-degraded nodes, and
    designating, as a critical group, each group of nodes along the dimension that does not include any degraded nodes,
  for each non-degraded node in a forwarding group of nodes along the dimension, forwarding a respective individual gradient vector for the node along the dimension until forwarding the respective individual gradient vector to a respective receiving node in a respective critical group of nodes along the dimension,
  updating, for each receiving node, a respective individual gradient vector with an intermediate gradient vector, wherein the intermediate gradient vector is computed from the respective individual gradient vector and one or more received individual gradient vectors, performing a reduction on each critical group of nodes along the dimension to generate a respective partial final gradient vector for the critical group, and updating, for each critical group of nodes, an individual gradient vector for a representative node with the respective partial final gradient vector.

12. The system of claim 11,
wherein the dimension is a first dimension,
wherein combining the respective individual gradient vectors in the nodes to generate the final gradient vector comprises performing the operations for each dimension of the n-dimensional network topology, including the first dimension, and
wherein the system further comprises repeating the operations for a next dimension on a sub-network comprising only the representative nodes, until generating the final gradient vector.

13. The system of claim 12, wherein the operations further comprise:
updating model parameter values of the machine learning model with the final gradient vector; and
broadcasting the updated model parameter values to each non-degraded node.

14. The system of claim 11, wherein designating each group of nodes in multiple groups of nodes in each dimension as a forwarding group of nodes or a critical group of nodes, based on the presence of one or more degraded nodes in the group of nodes, comprises:
determining that the group of nodes comprises one or more degraded nodes, and in response, designating the group of nodes as a forwarding group of nodes.

15. The system of claim 11, wherein designating each group of nodes in multiple groups of nodes in each dimension as a forwarding group of nodes or a critical group of nodes, based on the presence of one or more degraded nodes in the group of nodes, comprises:
determining that the group of nodes comprises one or more degraded nodes, and in response, designating the group of nodes as part of one or more sub-networks of nodes, wherein the one or more sub-networks of nodes exclude the one or more degraded nodes.

16. The system of claim 15, wherein the reduction is a first reduction, and the system wherein the operations further comprise, for each sub-network of nodes:
performing, for each sub-network of nodes along the dimension, a second reduction on the sub-network of nodes to generate a respective internal gradient vector; and
forwarding the respective internal gradient vector for each sub-network of nodes until forwarding the internal gradient vector to a node in a critical group of nodes along the dimension.

17. The system of claim 11, wherein the network topology is a mesh topology.

18. The system of claim 11, wherein the network topology is a torus topology.

19. The system of claim 11, wherein the operations further comprise:
determining that a particular node is not degraded and that every neighboring node of the particular node is degraded along a particular dimension; and
in response, indicating that the particular node is degraded along the particular dimension.

20. The system of claim 11, wherein performing a reduction on each critical group of nodes along the dimension to generate a respective partial final gradient vector comprises performing a circle reduction on each critical group of nodes.

21. One or more non-transitory computer-readable storage media encoded with instructions that, when executed by one or more computers, cause the one or more computers to perform operations for parallel processing training data, the operations comprising:
one or more computers and one or more storage devices on which are stored instructions that are operable, when executed by the one or more computers, to cause the one or more computers to perform operations for parallel processing training data, the operations comprising:
training a respective replica of a machine learning model on each node of multiple nodes organized in an n-dimensional network topology, wherein n is an integer greater than or equal to 1,
wherein a plurality of the multiple nodes are trained on a respective batch of training data in parallel,
wherein one or more nodes in the plurality of the multiple nodes have been classified as degraded, and
wherein each non-degraded node stores a respective individual gradient vector resulting from training the respective replica for the node on the respective batch of training data; and
combining the respective individual gradient vectors in the nodes to generate a final gradient vector by performing operations comprising, for a dimension of n dimensions in the network topology:
designating each group of nodes along the dimension as either a forwarding group or a critical group based on whether the group of nodes includes any degraded nodes, comprising:
designating, as a forwarding group, each group of nodes along the dimension that includes one or more degraded nodes and one or more non-degraded nodes, and
designating, as a critical group, each group of nodes along the dimension that does not include any degraded nodes,
for each non-degraded node in a forwarding group of nodes along the dimension, forwarding a respective individual gradient vector for the node along the dimension until forwarding the respective individual gradient vector to a respective receiving node in a respective critical group of nodes along the dimension,
updating, for each receiving node, a respective individual gradient vector with an intermediate gradient vector, wherein the intermediate gradient vector is computed from the respective individual gradient vector and one or more received individual gradient vectors,
performing a reduction on each critical group of nodes along the dimension to generate a respective partial final gradient vector for the critical group, and
updating, for each critical group of nodes, an individual gradient vector for a representative node with the respective partial final gradient vector.

22. The computer readable media of claim 21,
wherein the dimension is a first dimension,
wherein combining the respective individual gradient vectors in the nodes to generate the final gradient vector comprises performing the operations for each dimension of the n-dimensional network topology, including the first dimension, and wherein the computer readable media further comprises repeating the operations for a next dimension on a sub-network comprising only the representative nodes, until generating the final gradient vector.

23. The computer readable media of claim 22, wherein the operations further comprise:

updating model parameter values of the machine learning model with the final gradient vector; and broadcasting the updated model parameter values to each non-degraded node.

24. The computer readable media of claim 21, wherein designating each group of nodes in multiple groups of nodes in each dimension as a forwarding group of nodes or a critical group of nodes, based on the presence of one or more degraded nodes in the group of nodes, comprises:

determining that the group of nodes comprises one or more degraded nodes, and in response, designating the group of nodes as a forwarding group of nodes.

25. The computer readable media of claim 21, wherein designating each group of nodes in multiple groups of nodes in each dimension as a forwarding group of nodes or a critical group of nodes, based on the presence of one or more degraded nodes in the group of nodes, comprises:

determining that the group of nodes comprises one or more degraded nodes, and in response, designating the group of nodes as part of one or more sub-networks of nodes, wherein the one or more sub-networks of nodes exclude the one or more degraded nodes.

26. The computer readable media of claim 25, wherein the reduction is a first reduction, and the computer readable media wherein the operations further comprise, for each sub-network of nodes:

performing, for each sub-network of nodes along the dimension, a second reduction on the sub-network of nodes to generate a respective internal gradient vector; and forwarding the respective internal gradient vector for each sub-network of nodes until forwarding the internal gradient vector to a node in a critical group of nodes along the dimension.

27. The computer readable media of claim 21, wherein the network topology is a mesh topology.

28. The computer readable media of claim 21, wherein the network topology is a torus topology.

29. The computer readable media of claim 21, wherein the operations further comprise:

determining that a particular node is not degraded and that every neighboring node of the particular node is degraded along a particular dimension; and in response, indicating that the particular node is degraded along the particular dimension.

30. The computer readable media of claim 21, wherein performing a reduction on each critical group of nodes along the dimension to generate a respective partial final gradient vector comprises performing a circle reduction on each critical group of nodes.

* * * * *